United States Patent
Linlor

(10) Patent No.: US 7,273,168 B2
(45) Date of Patent: Sep. 25, 2007

(54) POINT-OF-SALE BILLING VIA HAND-HELD DEVICES

(75) Inventor: James Linlor, San Marcos, CA (US)

(73) Assignee: Xilidev, Inc., San Marcos, CA (US)

( * ) Notice: Subject to any disclaimer, the term of this patent is extended or adjusted under 35 U.S.C. 154(b) by 289 days.

(21) Appl. No.: 10/961,816

(22) Filed: Oct. 8, 2004

(65) Prior Publication Data

US 2005/0109838 A1    May 26, 2005

Related U.S. Application Data

(60) Provisional application No. 60/510,649, filed on Oct. 10, 2003.

(51) Int. Cl.
    *G06K 5/00*    (2006.01)
(52) U.S. Cl. ............... 235/380; 235/379; 235/382
(58) Field of Classification Search ............. 235/380, 235/379, 382; 705/39, 40
    See application file for complete search history.

(56) References Cited

U.S. PATENT DOCUMENTS

| | | | |
|---|---|---|---|
| 2002/0025796 A1* | 2/2002 | Taylor et al. | 455/406 |
| 2003/0055792 A1* | 3/2003 | Kinoshita et al. | 705/67 |
| 2003/0078844 A1* | 4/2003 | Takatori et al. | 705/17 |
| 2004/0020988 A1 | 2/2004 | Omori | |
| 2004/0059671 A1* | 3/2004 | Nozaki et al. | 705/39 |
| 2004/0098353 A1 | 5/2004 | Smith | |
| 2005/0216354 A1 | 9/2005 | Bam et al. | |
| 2006/0070121 A1* | 3/2006 | Itabashi | 723/9 |
| 2006/0100961 A1 | 5/2006 | Paterno et al. | |
| 2007/0089168 A1* | 4/2007 | Wang et al. | 726/9 |

* cited by examiner

*Primary Examiner*—Steven S. Paik
(74) *Attorney, Agent, or Firm*—Knobbe Martens Olson & Bear LLP

(57) ABSTRACT

A payment resolution module is configured to communicate with hand-held devices (such as mobile phones, PDA's, or computers) to allow purchase of products using the hand-held devices, without requiring the user of the hand-held device to enter payment information for each transaction. The user of the hand-held device may be identified as the owner of the device either by having the option to enter a personal identification code, or by using a biometric to identify himself, for example. Accordingly, only an authorized user of the hand-held device may use the hand-held device to purchase products. After the payment resolution module receives authorization for payment, an authorization code is transmitted to the mobile device. The user may be required to present the authorization code at the point of sale, such as by entering the code into a computing device at the point-of-sale, prior to completion of the transaction.

23 Claims, 9 Drawing Sheets

POINT-OF-SALE BILLING VIA HAND-HELD DEVICES

RELATED APPLICATIONS

This application claims priority to provisional patent application No. 60/510,649, filed on Oct. 10, 2003.

BACKGROUND OF THE INVENTION

1. Field of the Invention

This invention relates to systems and methods for completing transactions using hand-held devices.

2. Description of Related Art

Convenient completion of financial transactions using hand-held devices continues to gain increasing popularity among consumers. For example, a consumer may call a number of retailers using a hand-held device, such as a mobile phone, provide the retailer with payment information, and have the desired product delivered to their home. Such an order may be placed using a variety of hand-held devices by any user who can read a credit card number. Accordingly, there is a potential for fraud in transactions using hand-held devices. In fact, there is currently no satisfactory mechanism for authenticating the identity of the person ordering a product using a hand-held device in order to ensure that the person is authorized to use the provided payment information.

SUMMARY OF THE INVENTION

A payment resolution module is configured to communicate with hand-held devices (such as mobile phones, PDA's, or computers) to allow purchase of products using the hand-held devices, without requiring the user of the hand-held device to enter payment information for each sales transaction. The user of the hand-held device may be identified as the owner of the device either by having the option to enter a personal identification code, or by using a biometric to identify himself, for example. Accordingly, only an authorized user of the hand-held device may use the hand-held device to purchase products.

In one embodiment, the user of a hand-held device selects a desired product (or products) by responding to a series of product menus or entering a product identification code into the hand-held device, for example. In one embodiment, the hand-held device receives product information via a data communication signal, such as a RF or infrared signal, and the user may then select a product from the product information received from that data communication signal. The payment resolution module may immediately return a confirmation of the selected product to the hand-held device, along with availability, price, product description, and/or other product related information. In one embodiment, the payment resolution module determines the identity of the mobile device user and communicates information regarding the requested product, including total price of the product, to a payment authorization source, such as a credit card company. After the payment resolution module receives authorization for payment of the total price from the payment authorization source, the payment resolution module generates an authorization code that is transmitted to the mobile device, such as by using a short message service (SMS), for example. In one embodiment, in order for the user of the hand-held device to retrieve the product at the point-of-sale, the user must present the authorization code, such as by entering the code into a computing device at the point-of-sale, to confirm the user's identity. In this way, the use of an authorization code reduces fraud by ensuring that only the authorized user may retrieve the ordered goods or services. Additionally, because each user is automatically identified by the payment resolution module, a simplified system and method for completing transactions using hand-held devices is provided.

DETAILED DESCRIPTION OF CERTAIN EMBODIMENTS

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
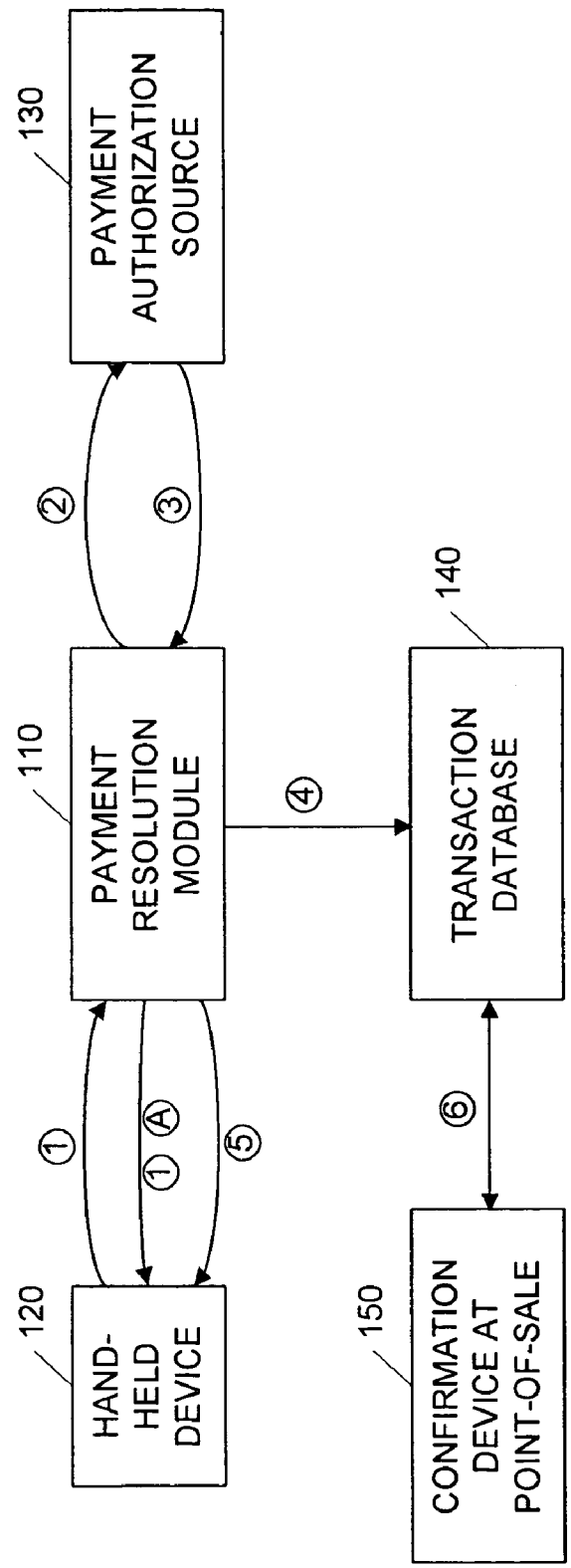
FIG. 1 is a block diagram illustrating an exemplary arrangement of modules that may be used in a point-of-sale billing system for hand-held devices.

FIG. 1 is a block diagram illustrating an exemplary arrangement of modules that may be used in a point-of-sale billing system for hand-held devices. The term "module," as used herein, means, but is not limited to, a software or hardware component, such as a field programmable gate array (FPGA) or an application specific integrated circuit (ASIC), which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

As illustrated in FIG. 1, a payment resolution module 110 is in bi-directional communication with both a hand-held device 120 and a payment authorization source 130. The payment resolution module 110 also is in communication with a transaction database 140, which maintains records of transactions that are currently in process and those that have already been completed. A confirmation device at the point-of-sale 150, or simply confirmation device 150, is accessed by the user of the hand-held device 120 before the ordered product may be retrieved. FIG. 1 also includes numbered steps, signified by numbers inside of circles, that illustrate the order of data flow in completing an authenticated transaction.

In operation, the hand-held device 120 initially contacts the payment resolution module 110 to place an order for a product (step 1 of FIG. 1). The contact between the hand-held device 120 and the payment resolution module 110 can be accomplished using existing cellular telephone infrastructure, such as dialing a telephone number which corresponds to the payment resolution module 110. A product may be identified, for example, by entering a product identification code, or by having such code received by a proximity-based system such as RFID or infrared, or by navigating a series of menus using the hand-held device 120. In one embodiment, once a product has been identified by the hand-held device 120, the payment resolution module 110 transmits a verification of the selected product to the hand-held device 120 (step 1A of FIG. 1).

In an advantageous embodiment, the payment resolution module 110 identifies the user of the hand-held device 120 using information that is unique to the hand-held device 120, such as caller ID information or a device identifier specific to the hand-held device 120. This information may be stored locally at the payment resolution module 110, or may be accessed on a remote computer system. For example, when a product request is received by the payment resolution module 110, information identifying the mobile device may be sent to a user resolution module (not shown). Such a module may list a plurality of mobile device identifiers, each associated with a user. Thus, a user resolution module may determine a user based upon a mobile device identifier. The determined user may then be returned to the payment resolution module 10. Accordingly, the payment resolution module 110 acquires an identity of a specific user along with a product requested by the specific user.

In step 2 of FIG. 1, the payment resolution module 110 transmits information identifying the user, along with the product information, such as the price of the product requested, to the payment authorization source 130. The payment authorization source 130 may communicate with any entity, such as a credit institution or a bank, that has the ability to authorize payments from the identified user. In one embodiment, the payment authorization source 130 comprises a credit card company or communicates with a credit card company. In another embodiment, the payment authorization source 130 comprises a provider of wireless service, or communication with a wireless service provider. In another embodiment, the payment authorization source 130 provides an interface to various banks, credit card companies, wireless service providers, or other payment authorization sources 130.

In step 3 of FIG. 1, the payment authorization source 130 returns to the payment resolution module 110 either an authorization or denial to charge the amount requested from the requested payment source. In one embodiment, the payment authorization source 130 may provide further information to the payment resolution module 110, such as a status of the user's account or other information that may be helpful in determining why a request was denied (or authorized).

In step 4 of FIG. 1, the payment resolution module 110 communicates information regarding the requested transaction and the response received from the payment authorization source 130 to the transaction database 140. The transaction database 140 is in communication with various product vendors, such as via a telephone, internet, or wireless connection, for example. In one embodiment, the payment resolution module 110 also generates an authorization code for any requested transaction that has been approved. This authorization code may be sent to, and stored at, the transaction database 140. The transaction database 140 maintains the transaction information and corresponding authorization codes so that the information is available at multiple point-of-sale locations to verify that specific requested transactions were either authorized or denied by the requested payment source via the payment authorization source 130. This creates an auditable log to reduce fraud, manage creditor-defined spending limits, and to enhance system flexibility and user-friendliness by allowing information to be shared across a vendor's multiple locations for increased efficiency in delivery. It also provides a log for post-processing of billing and charge resolution to the customer's account.

In an advantageous embodiment, upon receipt of authorization from the payment authorization source 130, the payment resolution module 110 transmits the authorization code to the hand-held device 120. This authorization code will be required in order for the user to retrieve the requested product at the point-of-sale. The transmission of the authorization code may be accomplished through the use of a secure communication protocol, such as the SSL protocol. Once the hand-held device 120 has received the authorization code from the payment resolution module 110, the user of the hand-held device 120 may retrieve the product from the point-of-sale by presenting the authorization code at the point-of-sale.

In one embodiment, the user of the hand-held device 120, or a sales person at the point-of-sale, enters the authorization code into the confirmation device 150, which is located at the point-of-sale, in order to confirm that the transaction was approved by the payment authorization source 130. The confirmation device 150 communicates with the transaction database 140 to confirm that the sales transaction has been authorized. When the confirmation device 150 confirms that the sales transaction was authorized, the user is allowed to retrieve the selected product and the payment authorization source 130 charges the appropriate payment source.

Figure 2A:
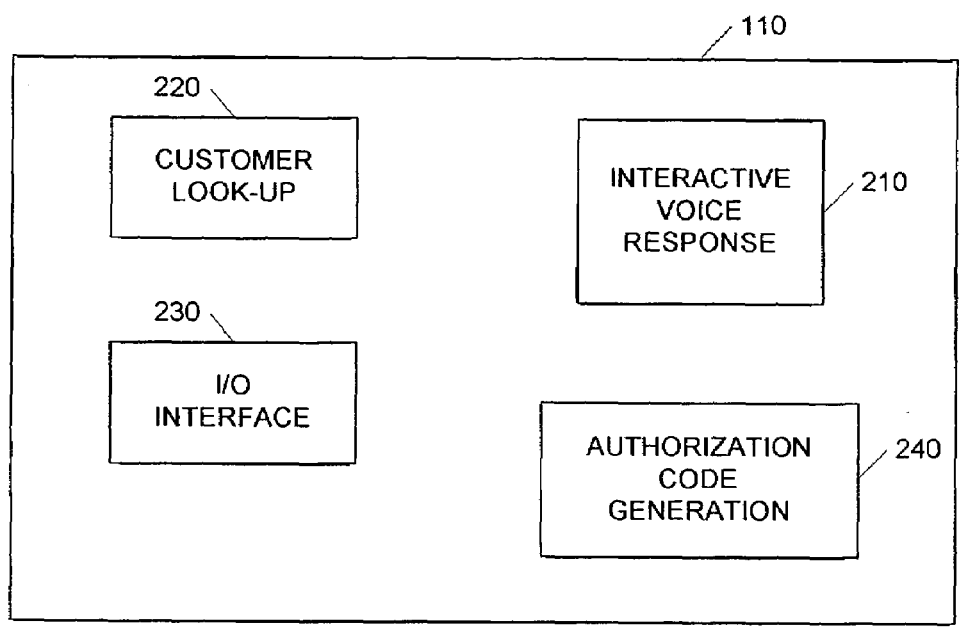
FIG. 2A is a block diagram illustrating exemplary modules in a payment resolution module, such as the payment resolution module illustrated in FIG. 1.

FIG. 2A is a block diagram illustrating exemplary modules of the payment resolution module 110. The exemplary payment resolution module 110 comprises a customer look-up module 220, an Input/Output (I/O) interface module 230, an interactive voice response module 210, and an authorization code generation module 240. Each of the exemplary modules is described below in further detail.

The I/O interface module 230 facilitates communications between the payment resolution module 110 and various remote systems. In one embodiment, the I/O module 230 is in communication with each of the other modules in the payment resolution module 110, such as those illustrated in FIG. 2A, for example. Additionally, the I/O interface module 230 may be configured to communicate with multiple hand-held devices, such as cell phones or PDA's, for example. Accordingly, in one embodiment the I/O interface module 230 receives incoming calls from hand-held devices. In one embodiment, the I/O interface module 230 transmits an acknowledge message to a hand-held device upon receipt of a request to establish a communication link.

The I/O interface module 230 communicates using various communication mediums and protocols that are known in the art. For example, in one embodiment the I/O interface module 230 includes an interface for transmitting information via a wireless communication link, such as those available by cellular phone carriers. In one embodiment, the I/O interface module 230 communicates digital messages using the short message service (SMS) protocol.

The customer look-up module 220 receives information from the I/O interface module 230 regarding a hand-held device that is in communication with the I/O interface module 230. The information obtained from the I/O interface module 230 may then be used by the customer look-up module 220 to retrieve an identity of the owner of the hand-held device and/or payment information associated with the hand-held device. For example, the customer look-up module 220 may receive caller ID (CID) information from the I/O interface module 230. The CID information may then be used to link the hand-held device to a particular user. As noted above, mapping a hand-held device to a user may be performed by the customer look-up module 220 or may be performed by a user resolution module that may be external to the payment resolution module 110. In another embodiment, the customer look-up module 220 receives a device ID, such as a MAC address of a hand-held device, from the I/O interface module 230, which may be used to map the hand-held device to a user. In another embodiment, the customer look-up module 220 receives an IP address, or other internet address information, for the I/O interface module 230, which may be used to map the hand-held device to a user. In one embodiment, the customer look-up module 220 also determines a location of the hand-held device according to the information received from the I/O interface 230.

The interactive voice response (IVR) module 210 interacts with the user operating the hand-held device to determine the specific products and/or services the user wishes to order. In one embodiment, the IVR module 210 is an automated system that communicates data to the hand-held device based on a structure of menus. The menu structure may be transmitted to the hand-held device graphically or, alternatively, communicated to the user with voice instructions. In one embodiment, the menu that a particular user accesses is based on a location of the user, as may be determined by the customer look-up module 220 or entered by the user. In this way, the IVR module 210 may personalize the menu according to the particular customer and/or according to the retail stores in a defined area surrounding the user's location.

The authorization code generation (ACG) module 240 generates an authorization code that will be necessary for the user to complete an authorized transaction at the POS. More particularly, when a particular transaction has been authorized, the ACG module 240 generates a code, or string of alphanumeric characters, which are transmitted to the hand-held device in the manner discussed above with reference to FIG. 1, for example. In one embodiment, the ACG module 240 is in communication with the I/O interface 230 so that the authorization code may be transmitted to the hand-held device via the I/O interface 230. In an advantageous embodiment, the authorization code is encoded, such as by using SSL, to reduce the risk of interception and decoding of the authorization code. The authorization code generated by the ACG module 240 may also be transmitted to the transaction database 140, which is accessed by the POS in order to confirm entry of the correct authorization code by the user at the POS. The confirmation process will be discussed in further detail below with reference to FIG. 8

Figure 2B:
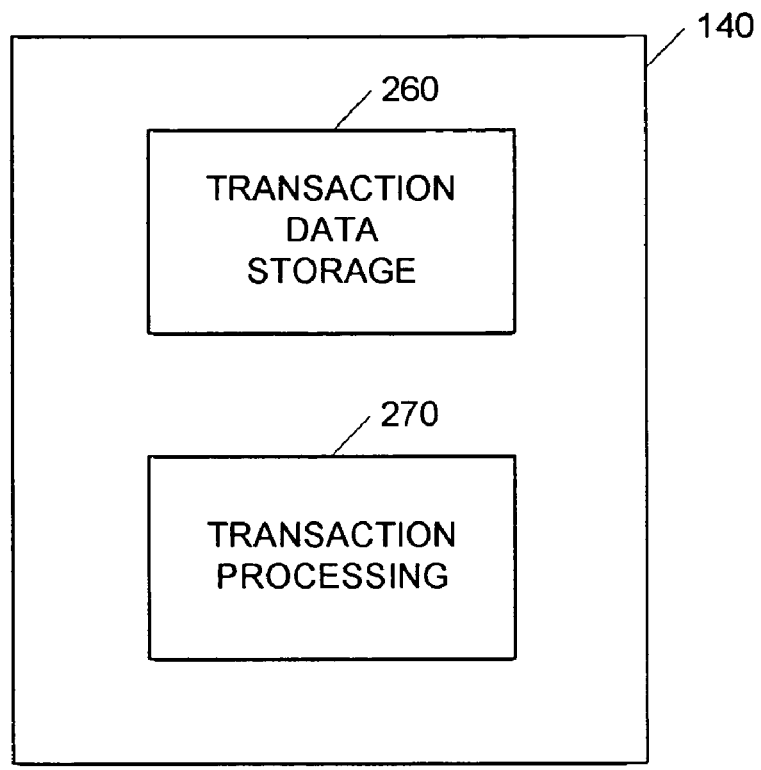
FIG. 2B is a block diagram illustrating exemplary modules in a transaction database, such as the transaction database illustrated in FIG. 1.

FIG. 2B is a block diagram illustrating exemplary modules in a transaction database, such as the transaction database 140 illustrated in FIG. 1. In the embodiment of FIG. 2B, the transaction database 140 includes transaction data storage module 260 and transaction processing module 270. As noted above, the transaction database 140 is coupled to the payment resolution module 110 and also to the confirmation device 150. The transaction database 140 is advantageously configured to maintain records of transactions that are currently in process and those that have already been completed.

The transaction data storage module 260 comprises any type of storage device known in the art, such as magnetic, electrical, or optical storage devices. In one embodiment, the transaction data storage module 260 comprises one or more hard drives. Transaction data, such as information related to (1) the user of the hand-held device 120, (2) the requested product or service, (3) the payment authorization source, (4) the authorization code, and (5) the status of the requested product or service, may be stored on the transaction data storage module 260. This information stored on the transaction data storage module 260 may be accessed by other modules of the system, such as those illustrated in FIG. 1. In particular, the authorization code, user information, and product or service information may be accessed by the confirmation device 150 in order to complete an authorized transaction.

The transaction processing module 270 advantageously accesses the transaction data storage module 260 and communicates with the confirmation device 150 at the point of sale. In one embodiment, the transaction processing module 270 receives authorization requests from various confirmation devices 150. Upon receiving such requests, which include an authorization code, the transaction processing module 270 accesses the transaction data storage module 260 in order to determine if the transaction is authorized. As noted above, the authorization code may advantageously be transmitted using a secure transmission protocol, such as SSL. In one embodiment, the transaction processing module 270 simply compares the authorization code received from the confirmation device 150 to any authorization codes associated with the user operating the confirmation device 150. If the authorization code entered at the confirmation device matches an authorization code associated with the user, the transaction processing module 270 sends an authorization signal to the confirmation device 150 indicating that the transaction has been authorized. The transaction processing module 270 may then initiate payment for the already authorized transaction. This may be accomplished by transmitting a message to the payment authorization source 130, or directly to a payment source, indicating that the payment amount should be charged to the user's account.

In another embodiment, after matching an authorization code received from the confirmation device 150 with an authorization code stored in the transaction data storage module 160, the transaction processing module 270 performs further authorization procedures before responding to the confirmation device. For example, the transaction processing module 270 may analyze the time difference between authorization of the transaction and the time of receipt of the authorization code from the confirmation device 150. In one embodiment, transactions have a time-out, such that the authorization is only valid for a predetermined amount of time, such as 30 minutes, 1 hour, 4 hours, 1 day, or 1 week, for example. Accordingly, if a transaction has timed-out, even if a proper authorization code is entered at the confirmation device 150, the transaction processing module 270 will not authorize the confirmation device 150 to complete the transaction. In other embodiments, the transaction processing module 270 may also compare information received from the confirmation device regarding the user, the hand-held device, or the payment source, for example, with information regarding these same items stored in the transaction data storage module 160.

Figure 3:
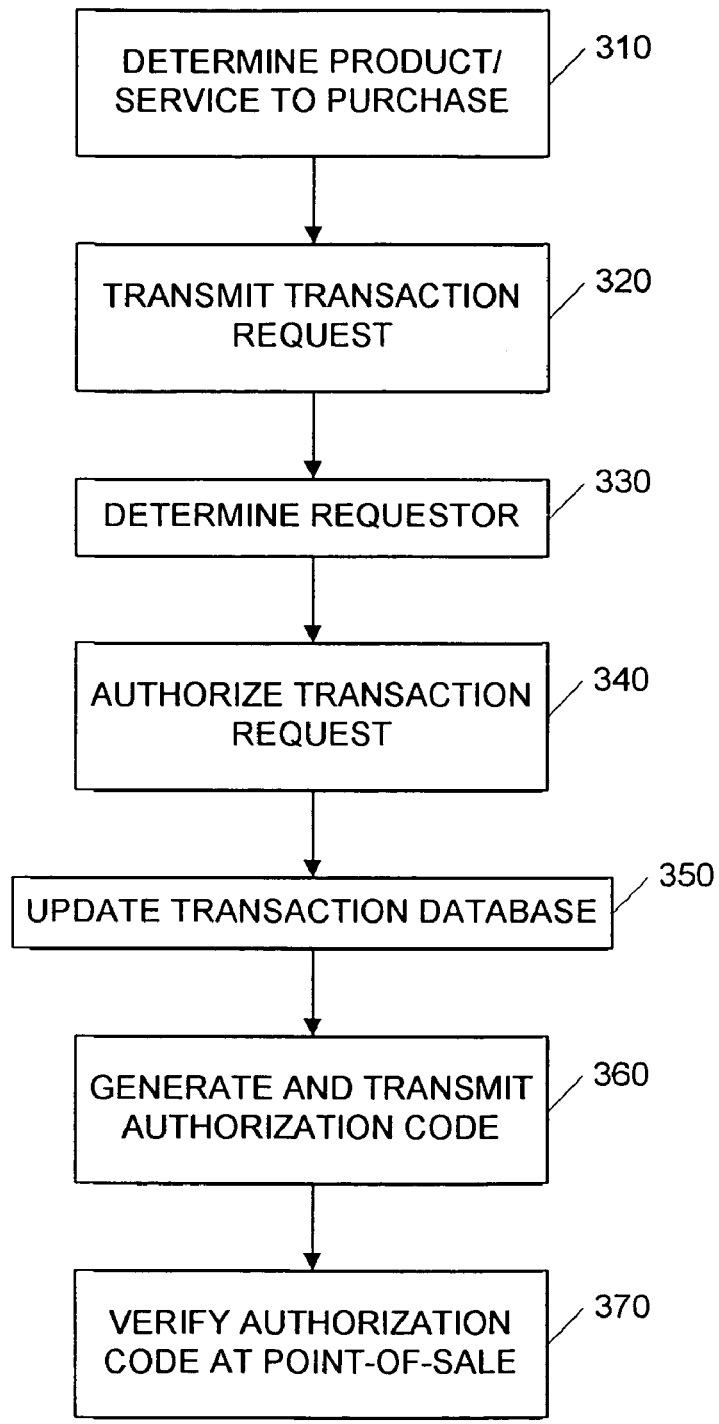
FIG. 3 is a flow chart illustrating an exemplary method of completing an authenticated transaction.

FIG. 3 is a flow chart illustrating an exemplary process of securely completing a transaction using a hand-held device, without the need to enter payment information. In one embodiment, the method of FIG. 3 automatically identifies a user and a corresponding payment source, based upon identification information from the hand-held device. In one embodiment the identification information is wirelessly transmitted from the hand-held device and includes personally-identifiable information regarding the user, such as an identification code or a biometric. Thus, based upon the identification information, the system may prevent unauthorized users from proceeding with a transaction request. In this way, the method of FIG. 3 secures and simplifies the process of completing purchase of a product or service.

In a block 310, the user determines the product and/or service to purchase. For ease of description herein, any reference to a product is also applicable to a service and vice versa. A product may be advertised in any manner, including conventional methods, such as billboards, flyers, and magazine ads. In one embodiment, the advertisement includes a telephone number to call in order to order the product.

Continuing to a block 320, the user transmits a transaction request to a payment resolution module. In one embodiment, a desired product is identified by entering a product identification code or by navigating a series of menus using the hand-held device 120. For example, an advertisement for a specific product may include an identification code so that a user may enter only the identification code, and possibly a quantity, as part of the transaction request. In another embodiment, the user is presented with a number of hierarchal menus on a display of the hand-held device. By navigating these menus, the user determines one or more products for purchase. Those of skill in the art will recognize that a product may be selected in any number of other manners.

Moving to a block 330, the identity of the user (referred to also as a "requester") is determined. As discussed above, in one embodiment the user is identified based on information that is transmitted by the hand-held device 120, such as a serial number of the hand-held device 120 or CID information. A database, such as the transaction database 140 of FIG. 1, may be accessed in order to match a hand-held device 120 to a specific user. In one embodiment, the user may comprise multiple users, such as members of a family. Thus, in this embodiment, several users may be associated with a single user account.

In a block 340, the transaction request is either authorized or denied. In one embodiment, the transaction request is transmitted to a payment authorization source 130 to determine if the user is authorized to complete the transaction. The payment authorization source 130 may have access to information regarding the user's credit and/or other payment sources that are associated with the user.

Next, in a block 350, a transaction database 140 is updated with the results from the payment authorization source. In one embodiment, the transaction database 140 maintains records of transactions that are currently in process and those that have already been completed. The transaction database 140 may store the transaction data, including the product information, for example, or may only store a transaction identifier, along with an indicator of whether the transaction is authorized.

Moving to a block 360, an authorization code is generated and transmitted to the hand-held device. In one embodiment, this authorization code is necessary for the user to complete the transaction at the point of sale.

Finally, at a block 370, the user enters the authorization code at the point of sale and the transaction is authorized. In one embodiment, the authorization device at the point of sale accesses the transaction database 140 in order to compare the authorization code entered by the user with the authorization code received from the transaction authorization source.

Figure 4:
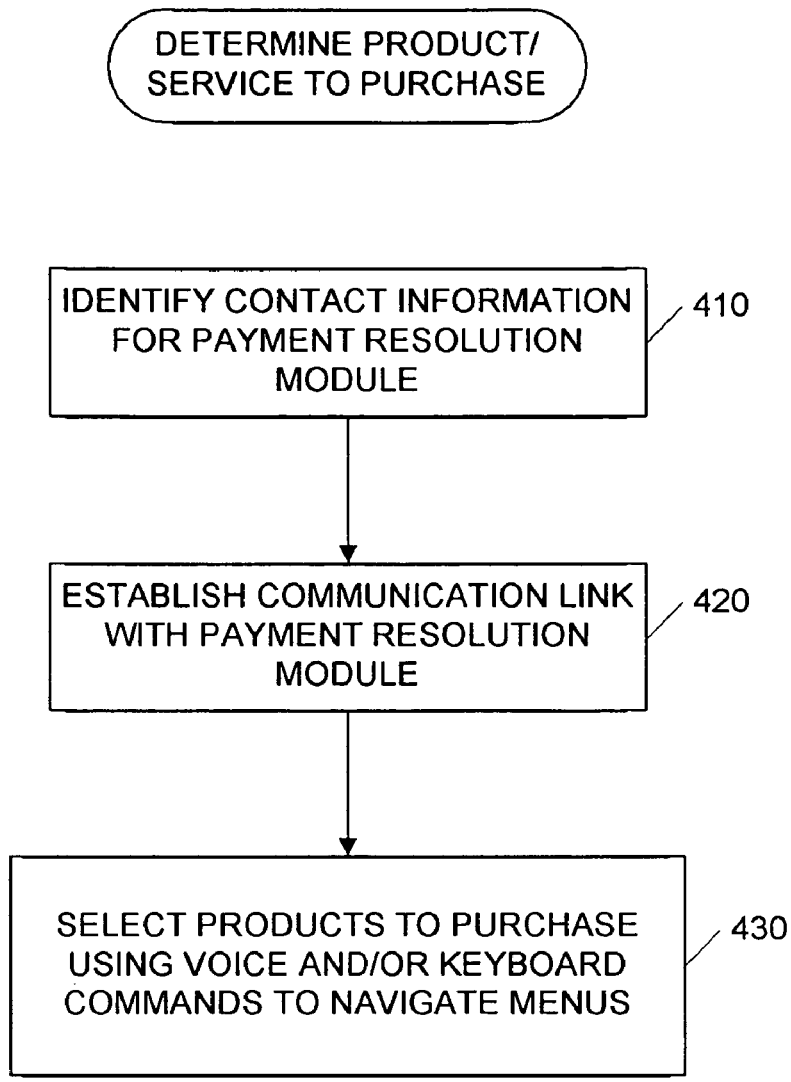
FIG. 4 is a flow chart illustrating an exemplary process by which the user of a hand-held device may determine a product and/or service to purchase.

FIG. 4 is a flow chart illustrating an exemplary process by which the user of a hand-held device 120 may determine a product and/or service to purchase.

In block 410, the contact information for the payment resolution module is identified. Contact information may include, for example, a telephone number or IP address. Contact information may be obtained from various sources, such as advertising on billboards, television, radio, or the point of sale. Certain hand-held devices may also have access to one or more databases of vendors that may be contacted to make purchases using the process described herein.

In block 420, a communication link with the payment resolution module 110 is established. For example, a cellular phone may call a telephone number advertised on a billboard in order to order products from a vendor. As another example, the user of a PDA having internet access may contact a payment resolution module 110 via a wireless connection established with an advertised IP address (or other identifier). In one embodiment the communication link is secured so that interception and decoding of the transmitted information is increasingly difficult. For example, the communication link may be secured by encrypting all transmitted data.

In block 430 the user of the hand-held device 120 selects one or more products to purchase using voice and/or keyboard commands. In one embodiment, keys on the hand-held device 120 are pressed in response to menu choices communicated from the payment resolution module 110. For example, a user may press a specific key, or key combination, to indicate a particular type, brand, size, color, or quantity of a product. Alternatively, in one embodiment the user may use voice commands to identify one or more products. For example, the user may speak commands indicating a type of product, such as "coffee," "bagel," "movie," or "groceries," for example. Alternatively, the user may speak commands, such as "1," "2," "A," or "B," in order to navigate a menu of product choices. In another embodiment, a combination of voice and keypad commands are used in order to identify a product for purchase.

In yet another embodiment, the user may select a product for purchase by placing the hand-held device in proximity to the product, or a representation of the product, thereby placing the hand-held device in range to receive product information from a communication device, such as an RFID tag or infrared transceiver, near the product. In this embodiment, the user may have a pre-set rule indicating that when the hand-held device is brought in close proximity to a product, the hand-held device automatically transmits a transaction request for the product. In another embodiment, the user may push one or more buttons on the hand-held device, or speak a verbal command into the hand-held device, for example, in order to confirm that a transaction request for a product in close proximity should be transmitted. In this embodiment, the hand-held device may display identifying information regarding the product that is in close proximity.

Figure 5:
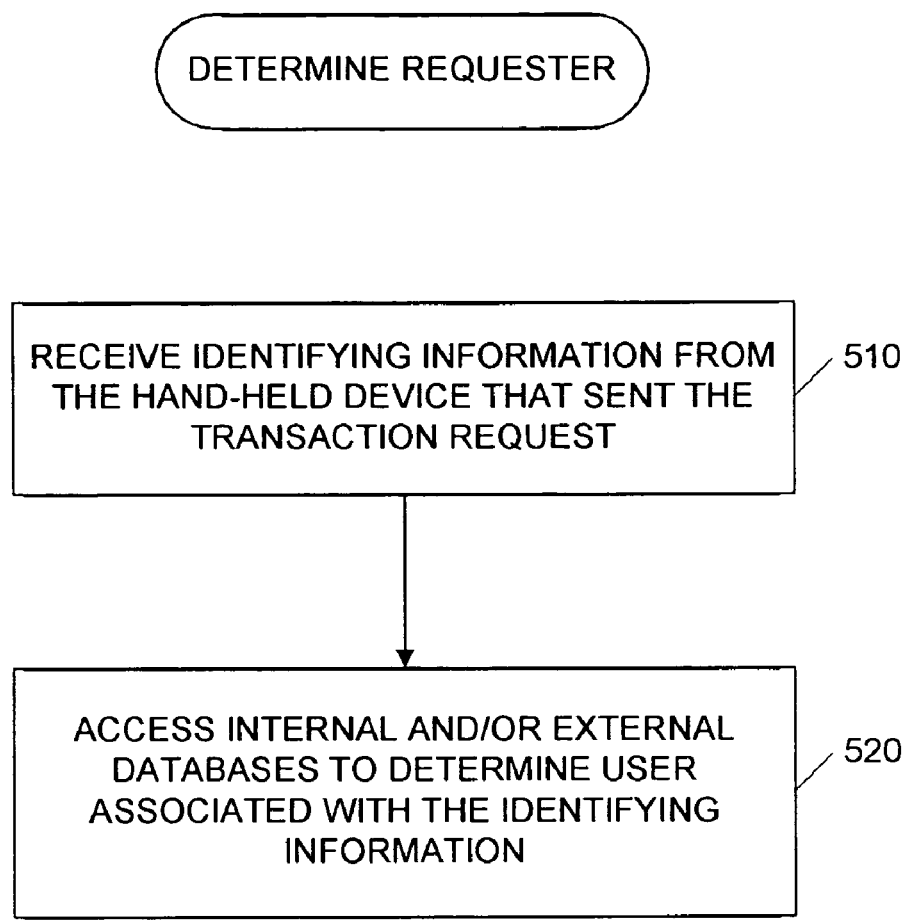
FIG. 5 is a flow chart illustrating an exemplary process of determining the identity of the user of a hand-held device.

FIG. 5 is a flow chart illustrating an exemplary process for determining the identity of the user of the hand-held device 120. As described below, in an advantageous embodiment, the identity of the hand-held device 120 user is advantageously determined based on identification information related to the hand-held device 120.

In block 510, the payment resolution module receives identifying information from the hand-held device. The identifying information may be any information, in any format, that uniquely identifies the particular hand-held device 120. For example, in one embodiment Caller ID (CID) information is determined by the payment resolution module 110 and used to uniquely identify the hand-held device 120. Alternatively, a device serial number or IP address may be used to uniquely identify each hand-held device 120. It is expressly contemplated that any other type and format of identifying information may also be used according to the methods described herein.

In block 520, the identifying information is used to query one or more databases in order to determine the user of the hand-held device 120. For example, if CID information for the hand-held device 120 is obtained, a reverse telephone number lookup database may be accessed to determine the owner of the hand-held device 120. In one embodiment, a device identification code associated with the hand-held device 120 is received by the payment resolution module 110 and a database mapping users with device identification codes is accessed to determine the user. Such a mapping database may be maintained in conjunction with the transaction database 140, payment authorization source 130, or any other internal or external database.

Figure 6:
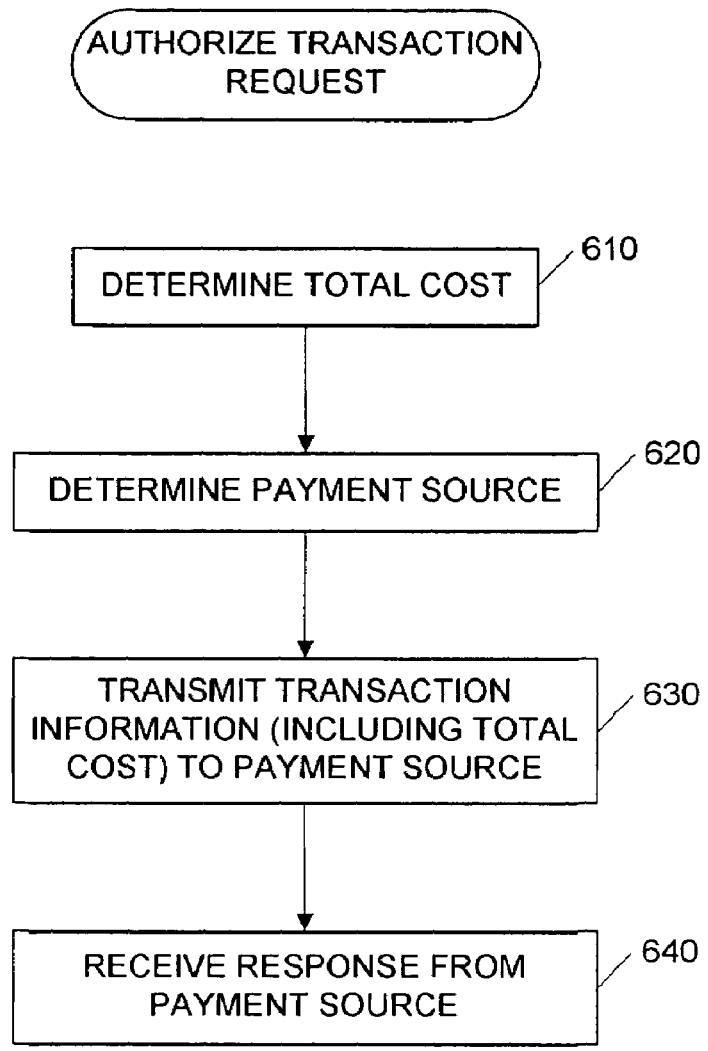
FIG. 6 is a flow chart illustrating an exemplary process of authorizing a transaction request received at the payment resolution module.

FIG. 6 is a block diagram illustrating an exemplary process of authorizing a transaction request received at the payment resolution module 110. In one embodiment, a transaction request, including a total cost, is generated by the interaction of the hand-held device 120 and the payment resolution module 110. As described below, before a transaction request may be completed, a payment source, such as a credit card company, may be queried to determine if the total cost is available from the user account.

In a block 610, the payment authorization source 130 determines a total cost for the transaction requested by the payment resolution module 110. This may include calculating costs for multiple quantities of the same product, costs for various products and any applicable tax, handling, and shipping charges. In one embodiment, the total cost is determined by the payment resolution module 10 and transmitted to the payment authorization source 130.

Moving to a block 620, a payment source is determined. Exemplary payment sources include various bank accounts, credit card accounts, and wireless service provider accounts. In one embodiment, the user has only one account and, thus, this account is the determined payment source. In another embodiment, the user has several possible payment sources and the payment sources are prioritized. For example, one user may prioritize payment sources so that a credit card account is used for large transactions, while a bank account is used as the payment source for other transactions. In another embodiment, a particular payment source may be selected first for a user while a second payment source is only selected when the first payment source does not authorize the transaction. In yet another embodiment, payment sources may be selected based upon the type of product or service that is being requested. Those of skill in the art will recognize that the payment source may be any source that agrees to make a payment on behalf of the user and the payment source may be selected based on any criteria.

Continuing to a block 630, transaction information is communicated to the selected payment source. In one embodiment, user account information and the total transaction price are transmitted to the payment source. In another embodiment, additional information, such as a location of the user, information regarding the point of sale, or information about the requested products, for example, may also be transmitted to the payment source.

At a block 640, the payment authorization source 130 receives information from the selected payment source indicating whether the requested transaction is authorized. The response from the payment source may be simply a yes or no response, represented by any number of data indicators, or a response including additional details for completing the transaction. In one embodiment, the payment source indicates that further information is necessary in order to authorize payment of the requested transaction amount. For example, the payment source may request the zip code, mailing address, or other information regarding the user.

Figure 7:
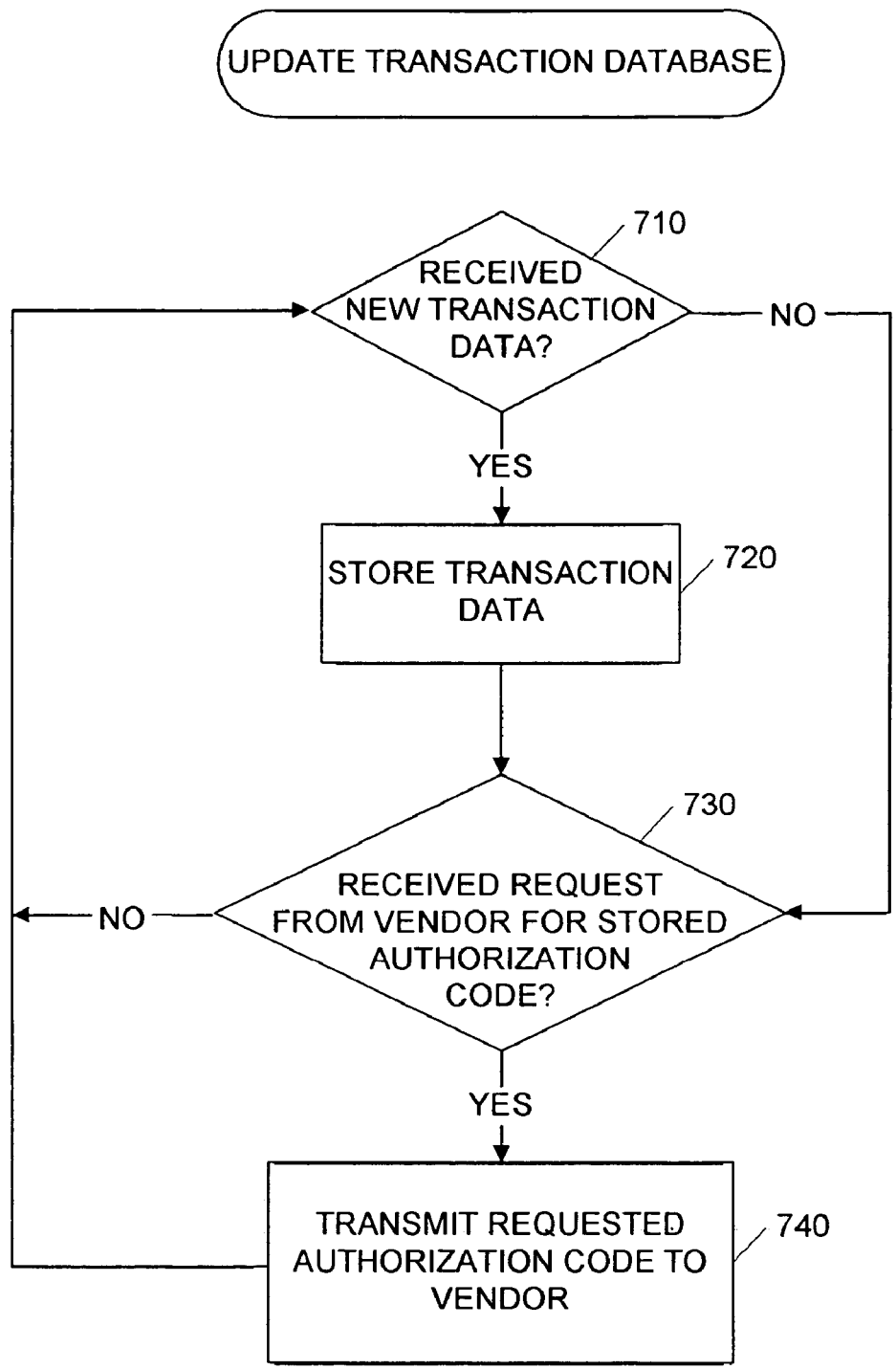
FIG. 7 is a flow chart illustrating an exemplary process of updating a transaction database.

FIG. 7 is a flow chart illustrating an exemplary process of updating a transaction database. In one embodiment, the method described in FIG. 7 is performed by a transaction database 140. However, any other module may perform these features.

In a decision block 710, the transaction database 140 determines whether new transaction data has been received. As described above, transaction data may be transmitted from the payment resolution module 110 for storage on the transaction database 140. In one embodiment, transaction data may also be received directly from the hand-held device 120, the payment authorization source, the payment source, or the confirmation device 150, for example. The transaction data may include information regarding a user, such as address; current location; credit history; maximum transaction allowance; information regarding the requested transaction, such as a type, model, brand, size, color, or quantity of a product; and/or information regarding the user's authorization to complete the transaction, such as an authorization code.

If it is determined in block 710 that new transaction data has been received, the method moves to a block 720 where the received transaction data is stored in the transaction database 140. The transaction database 140 may use any available organization method and file system structure for storage of data.

From block 720, or from block 710 if it was determined that new transaction data had not been received, the method continues to a decision block 730, wherein the transaction database determines if an authorization request has been requested from a point of sale vendor. If an authorization code has not been requested by a vendor, the methods returns to block 710 and repeats the process. If an authorization code has been requested by a vendor, the method continues to a block 740.

In block 740, the authorization code is transmitted to the point of sale vendor using encryption and/or a secure communication protocol. In another embodiment, the authorization code is not transmitted to the point of sale, but instead, the authorization code entered by the user is transmitted to the transaction database. In this embodiment, the transaction database may perform an authorization procedure that is similar to that described in FIG. 8.

Figure 8:
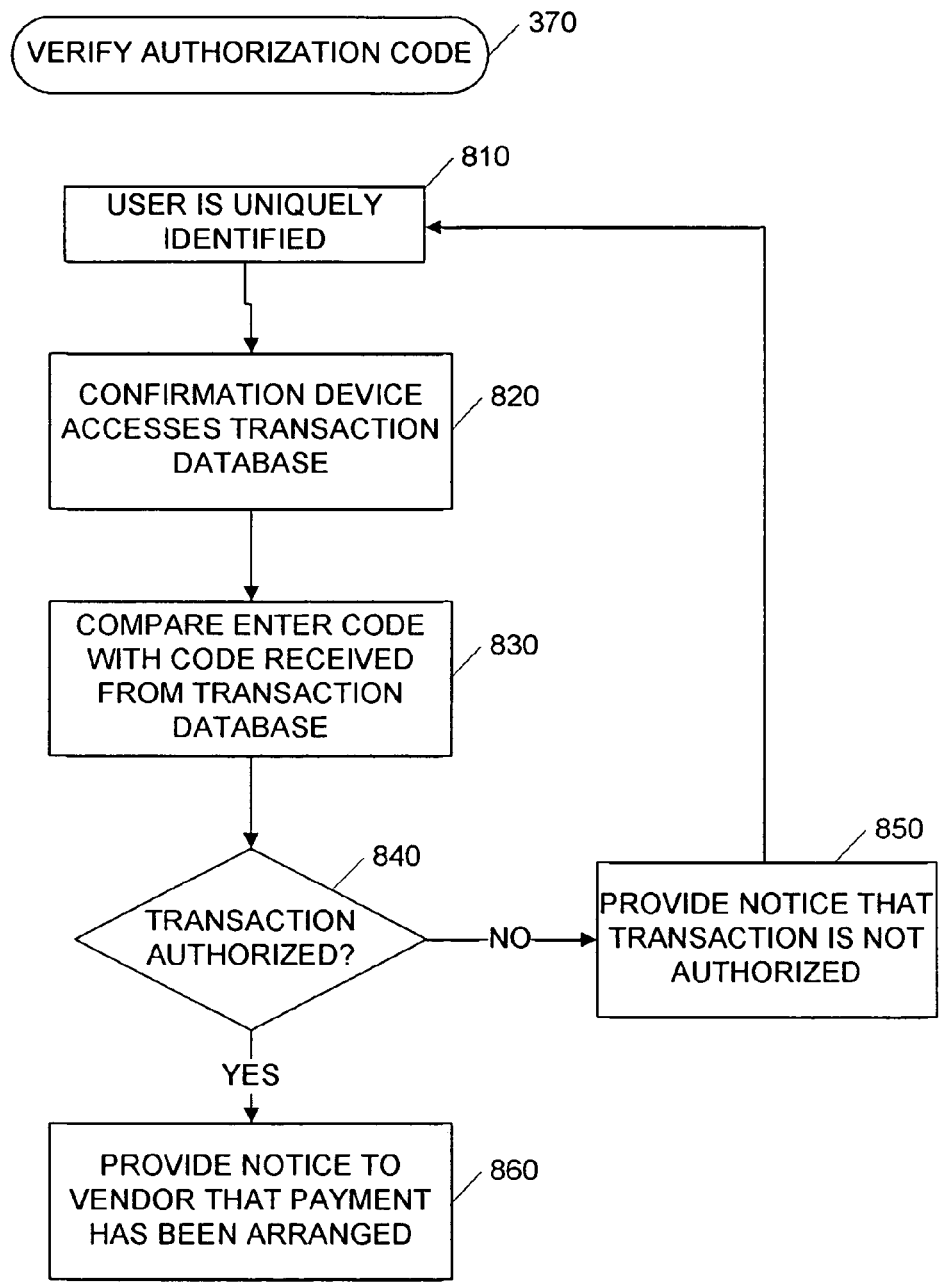
FIG. 8 is a flow chart illustrating an exemplary process of verifying an authorization code.

FIG. 8 is a flow chart illustrating an exemplary process of verifying an authorization code. In one embodiment, the authorization code is verified by the confirmation device 150.

In a block 810, the user is uniquely identified to the confirmation device. In one embodiment, the user is identified by entering the authorization code received from the payment resolution module 110 into the confirmation device 150. In one embodiment, the user types the authorization code on a keyboard connected to the confirmation device 150. In another embodiment, the hand-held device 120 communicates the authorization code to the confirmation device 150 via a wired or wireless connection, for example.

Moving to a block 820, the confirmation device 150 accesses the transaction database 140. In one embodiment, the transaction database 140 queries a list of authorization codes in search of an authorization code that matches the code entered by the user. In another embodiment, the transaction database receives information from the confirmation device regarding a particular transaction. The transaction database 140 then locates the particular transaction and transmits an authorization code corresponding to that transaction to the confirmation device.

In a block 830, the authorization code from the transaction database 140 is compared to the authorization code entered by the user at the confirmation device 150.

Moving to a block 840, the result of the comparison performed in block 830 is analyzed to determine if the transaction is authorized. In one embodiment, if the authorization codes entered by the user and stored on the transaction database 140 are the same, then the transaction is authorized and the process continues to a block 860. Otherwise, if the authorization codes entered by the user and stored on the transaction database 140 are not the same, then the transaction is not authorized and the process continues to a block 850.

Continuing to block 850, the vendor is notified that the requested transaction is not authorized. In one embodiment, the user at the confirmation device 150 is first notified and given another opportunity to enter the authorization code. The vendor may be notified via the confirmation device 150 and/or via another computer that is controlled by the vendor. For example, a computer that is operated by a manager or worker at the point of sale may receive information indicating that an invalid authorization code has been entered at the confirmation device 150. After providing notice of the invalid authorization code, the method returns to block 810 where the user, or another user, may enter an authorization code.

If the transaction has been determined to be authorized, at block 860 the vendor is notified that the transaction is authorized and payment has been secured. In one embodiment, a receipt is printed at the point of sale, such as by a printing device connected to the confirmation device 150. The receipt may be presented for pickup of the product or service. In another embodiment, a computer that is operated by a manager or worker at the point of sale may receive information indicating that a transaction has been authorized. In one embodiment, the transaction data is received and viewed by the vendor prior to the user entering the authorization code, so that the product may be ready for pickup by the user immediately after authorization. In another embodiment, after receiving notice that a transaction is authorized, the vendor prepares the product or service for the user.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of authenticating a transaction comprising:
   receiving from a hand-held device a transaction request associated with one or more products and a payment amount;
   determining a payment source associated with a user of the hand-held device;
   authorizing the transaction request;
   transmitting an authorization code to the hand-held device prior to completing the transaction request, the authorization code indicating that the payment source authorized deduction of the payment amount from an account of the user that is maintained by the payment source;
   storing the authorization code in a transaction database configured to store the authorization code and an indication of the transaction request;
   receiving the authorization code at a point-of-sale of the one or more products indicated in the transaction request;
   accessing the transaction database;
   comparing the received authorization code with the authorization code stored in the transaction database in order to verify the authorization code; and
   in response to verifying the authorization code, completing the transaction request by authorizing deduction of a transaction amount from the user account maintained by the payment source and authorizing release of the one or more products to the user of the hand-held device.

2. The method of claim 1, wherein the hand-held device is selected from the group including a cellular phone, a personal digital assistant, and a portable computer.

3. The method of claim 1, further comprising selecting the one or more products using the hand-held device.

4. The method of claim 3, wherein the act of selecting comprises:
   identifying contact information for contacting a payment resolution module;
   establishing a communication link between the hand-held device and the payment resolution module;
   navigating one or more product menus with the hand-held device.

5. The method of claim 4, wherein the contact information is selected from the group including a telephone number, an IP address, and a world wide web address.

6. The method of claim 4, wherein the act of navigating comprises speaking voice commands into the hand-held device.

7. The method of claim 1, wherein authorizing the transaction request comprises:
   receiving information identifying the hand-held device;
   accessing a database to map the information with a user.

8. The method of claim 7, wherein the information identifying the hand-held device is selected from the group comprising: Caller ID ("CID") information; a serial number of the hand-held device; an IP address assigned to the hand-held device; information regarding a unique radio tag coupled to the hand-held device; and a biometric information regarding the user.

9. The method of claim 3, wherein authorizing the transaction request comprises:
   determining a cost for the selected one or more products;
   transmitting the cost to the payment source associated with the user of the hand-held device; and
   receiving an authorization confirmation from the payment source.

10. The method of claim 1, further comprising updating the transaction database with information regarding the transaction.

11. The method of claim 10, wherein updating the transaction database comprises:
   storing information regarding the transaction request; and
   storing an authorization code associated with the transaction request.

12. A system for completing a transaction comprising:
   a payment authorization source configured to authorize payment for a transaction;
   a payment resolution module in communication with said payment authorization source;
   a hand-held device in communication with said payment resolution module, wherein the hand-held device transmits an authorization request to said payment resolution module;
   an I/O interface in communication with said payment resolution module and configured to transmit an authorization Code to said hand-held device in response to receiving authorization from said payment authorization source; and
   a confirmation device located at a point-of-sale, the confirmation device configured to receive the authorization code from a user of the hand-held device and, in response to validating the received authorization code, authorize the transaction.

13. The system of claim 12, wherein the payment resolution module is configured to receive identifying information from the hand-held device and map the identifying information to a user.

14. The system of claim 13, wherein the payment authorization source is in data communication with at least one of the following: a bank account of the user; a credit card account of the user; and a wireless service provider account of the user.

15. The system of claim 13, wherein the identifying information is selected from the group comprising: Caller ID ("CID") information; a serial number of the hand-held device; and an IP address assigned to the hand-held device.

16. The system of claim 12, wherein the hand-held device is selected from the group including a cellular phone; a personal digital assistant; and a computing device.

17. A system for authenticating a transaction comprising:
   means for transmitting a transaction request corresponding to one or more products;
   means for receiving the transaction request at a payment resolution module;
   means for authorizing the transaction request;
   means for transmitting an authorization code to a hand-held device prior to completing the transaction request;
   means for verifying the authorization code at a point-of-sale; and
   means for completing the transaction request by deducting a transaction amount from a payment source in response to an output from the means for verifying.

18. A method of completing a transaction, the method comprising:
   receiving information from a hand-held device that relates to one or more desired products, the hand-held device being located remote from a point-of-sale;
   at the point-of-sale, receiving an authorization code, generated by a payment resolution module, from a user of the hand-held device, the authorization code indicating that the payment source authorized deduction of the payment amount from a payment source, and in response thereto, verifying the authorization code at the point-of sale, deducting a transaction amount from the payment source and providing the goods to the user.

19. The method of claim 18, wherein the information from the hand-held device comprises a product identification code, a product quantity, and the transaction amount.

20. The method of claim 1, wherein receiving the authorization code at a location proximate the one or more products comprises presenting the authorization code received on the hand-held device at a point-of-sale.

21. The method of claim 20, further comprising entering the authorization code into a confirmation device at the point-of-sale.

22. The method of claim 21, wherein the user of the hand-held device enters the authorization code into the confirmation device.

23. The method of claim 21, wherein a sales associate at the point-of-sale enters the authorization code into the confirmation device.

* * * * *